(12) United States Patent
Li et al.

(10) Patent No.: US 10,238,028 B2
(45) Date of Patent: Mar. 26, 2019

(54) AUTOMATICALLY DETECTING OUTLIER VALUES IN HARVESTED DATA

(71) Applicant: THE CLIMATE CORPORATION, San Francisco, CA (US)

(72) Inventors: Yiqun Li, San Francisco, CA (US); Jeffrey Gerard, Seattle, WA (US)

(73) Assignee: The Climate Corporation, San Francisco, CA (US)

( * ) Notice: Subject to any disclaimer, the term of this patent is extended or adjusted under 35 U.S.C. 154(b) by 134 days.

(21) Appl. No.: 15/234,920

(22) Filed: Aug. 11, 2016

(65) Prior Publication Data

US 2018/0042174 A1 Feb. 15, 2018

(51) Int. Cl.

| | |
|---|---|
| *A01D 41/127* | (2006.01) |
| *G06F 17/30* | (2006.01) |
| *G06Q 10/06* | (2012.01) |
| *G06F 17/18* | (2006.01) |
| *G06Q 50/02* | (2012.01) |
| *G06T 11/20* | (2006.01) |

(52) U.S. Cl.
CPC .......... *A01D 41/127* (2013.01); *G06F 17/18* (2013.01); *G06F 17/30572* (2013.01); *G06Q 10/06* (2013.01); *G06Q 50/02* (2013.01); *G06T 11/206* (2013.01)

(58) Field of Classification Search
CPC ........................ A01D 41/127; G06F 17/30572; G06Q 50/02; G06T 11/206
USPC .......... 702/189, 191; 340/540, 601; 177/136
See application file for complete search history.

(56) References Cited

U.S. PATENT DOCUMENTS

| | | | |
|---|---|---|---|
| 6,505,146 B1 | 1/2003 | Blackmer | |
| 6,525,276 B1 | 2/2003 | Vellidus et al. | |
| 9,113,590 B2 * | 8/2015 | Johnson | A01B 79/005 |
| 2013/0018586 A1 | 1/2013 | Peterson et al. | |

OTHER PUBLICATIONS

International Searching Authority, "Search Report" in application No. PCT/US2017/039468, dated Sep. 13, 2017, 11 pages. Current Claims in application No. PCT/US2017/039468, dated Sep. 2017, 5 pages.
Sudduth et al., "Yield Editor 2.0: Software for Automated Removal of Yield Map Errors", dated Jul. 29-Aug. 1, 2012, 2012 ASABE Annual International Meeting, 14 pages.

* cited by examiner

*Primary Examiner* — John H Le
(74) *Attorney, Agent, or Firm* — Hickman Palermo Becker Bingham LLP; Malgorzata A. Kulczycka

(57) ABSTRACT

In an embodiment, a method comprises determining, in received yield data, one or more passes, each pass including a plurality of observations. For each pass of the one or more passes, one or more discrete derivatives are determined, and based on the one or more discrete derivatives first outlier data is generated. First filtered data is generated by removing the first outlier data from the yield data. Furthermore, for each observation in the yield data, a plurality of nearest neighbor observations is determined, and used to determine a plurality of absolute differences in yield values. Based on the plurality of absolute differences, second outlier data is determined. Second filtered data is generated by removing the second outlier data from the first filtered data. Using a presentation layer of a computer system, a graphical representation of the second filtered data is generated and displayed on the computing system.

18 Claims, 9 Drawing Sheets

Fig. 2 (a)
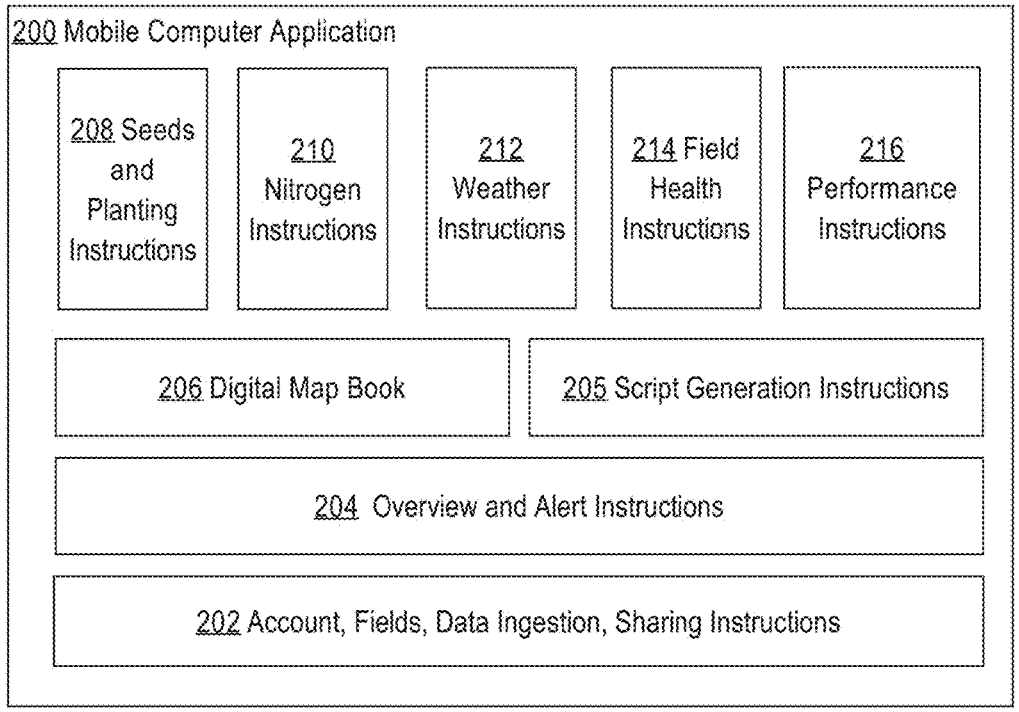
(b)
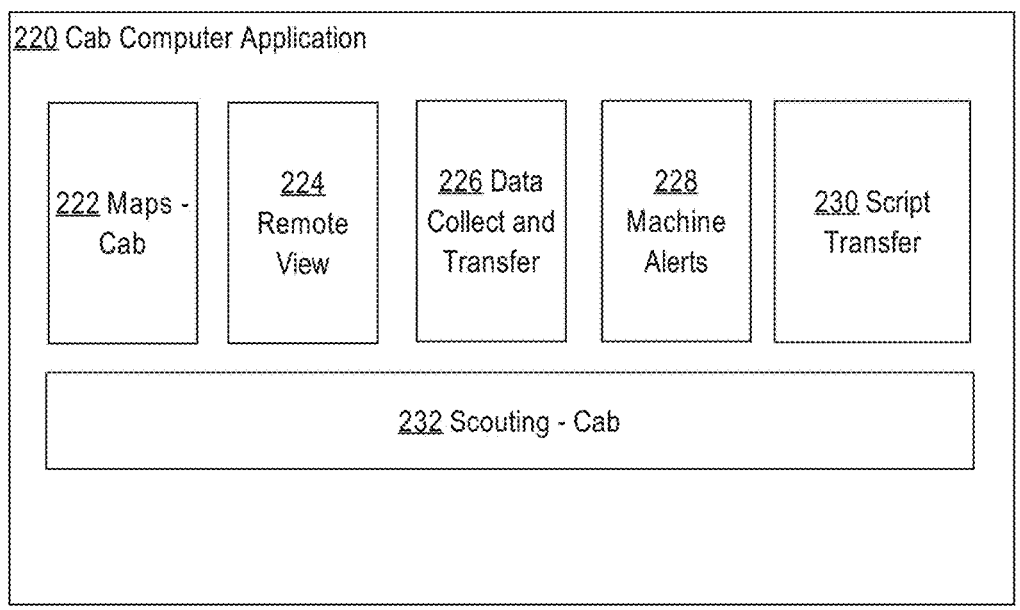

Data Manager

Nitrogen | Planting | Practices | Soil

Planting 1 (4 Fields)
Crop Corn Product
Plant Date: 2016-04-12
ILU 112 | Pop: 34000
[Edit] [Apply]

Planting 2 (0 Fields)
Crop Corn Product
Plant Date: 2016-04-15
ILU 83 | Pop: 34000
[Edit] [Apply]

Planting 3 (0 Fields)
Crop Corn Product
Plant Date: 2016-04-13
ILU 83 | Pop: 34000
[Edit] [Apply]

Planting 4 (1 Fields)
Crop Corn Product
Plant Date: 2016-04-13
ILU 112 | Pop: 34000
[Edit] [Apply]

[+] Add New Planting Plan

| | | CROP | PLANTED ACRES | PRODUCT | RELATIVE MATURITY | TARGET YIELD | POPULATION (AVG) | PLA |
|---|---|---|---|---|---|---|---|---|
| ☐ | Select All | | | | | | | |
| ☐ | Ames, IA 1<br>Corn \| 100 \| Boone, IA | Corn | — | DMC82-M | 112 | 160 | 34000 | Apr |
| ☐ | Austin, MN 1<br>Corn \| 100 \| Fredricks, MN | Corn | — | DMC82-M | 114 | 160 | 36000 | Apr |
| ☐ | Boone, IN 1<br>Corn \| 100 \| Boone, IA | Corn | — | DMC82-M | 112 | 150 | 34000 | Apr |
| ☐ | Champaign 1<br>Corn \| 100 \| Champaign, IL | Corn | — | — | 112 | 200 | 34000 | Apr |
| ☐ | E Nebraska 1<br>Corn \| 100 \| Burt, NE | Corn | — | — | 112 | 160 | 34000 | Apr |

FIG. 6

| 800 Computer Automated Preprocessing of Yield Data ||
|---|---|
| 802 Mechanical Errors ||
| 804 Are Pass Numbers Correct? | 806 Check whether pass numbers are recorded correctly. Check whether each pass has only one associated number. Check whether each pass number is associated with only one pass. Check whether any pass is missing. |
| 808 Any Short Passes? | 810 If a data logging interval for a pass is 1, then a pass is a short pass if it has a minimum count of observations of 30. If a data logging interval for a pass is 2, then a pass is a short pass if it has a minimum count of observations of 15. |
| 812 Any Flow Lag Delay? | 814 Determine whether a lag between two observations satisfies the following formula: lags = ceiling (1/(time interval)) * 2. |
| 816 Any Observations with Abrupt Speed Change, Speed Being too Slow, Speed Being too Fast? | 818 Determine whether a speed change between two consecutive points is greater than 20%. Determine whether a recorded speed is less than 2 mph, or whether a recorded speed is greater than 7 mph. |
| 820 Any Short Swath/ Overlap? | 822 Determine any observations corresponding to less than 80% of a width of a full recorded harvester bar. |

Fig. 8

AUTOMATICALLY DETECTING OUTLIER VALUES IN HARVESTED DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2016 The Climate Corporation.

FIELD OF THE DISCLOSURE

The technical field of the present disclosure includes computer systems useful in agriculture and climatology. The disclosure is also in the technical field of computer systems that are programmed or configured to automatically detect outlier data values based on digital yield map data, pipelined data processing, and computer-implemented data recommendations for use in agriculture.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Yield maps are widely used in agricultural management and consist of stored digital data representing the yield of crops that have been grown in and harvested from an agricultural field. However, many raw yield maps contain errors and inaccuracies. In fact, researchers have reported that 10% to 50% of the observations included in yield maps are incorrect. Incorrect observations are referred to as outlier data values or just outliers.

One advantage of decontaminating raw yield maps to obtain decontaminated maps that are free from outliers is that the decontaminated maps are useful to crop growers. Decontaminated maps can help the growers to customize the agricultural practices in terms of improving seeding schedules, irrigation, application of fertilizers such as nitrogen, and/or harvest practices.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 6 depicts an example embodiment of a spreadsheet view for data entry.

FIG. 8 depicts an example computer-automated preprocessing of yield data.

DETAILED DESCRIPTION

Figure 1:
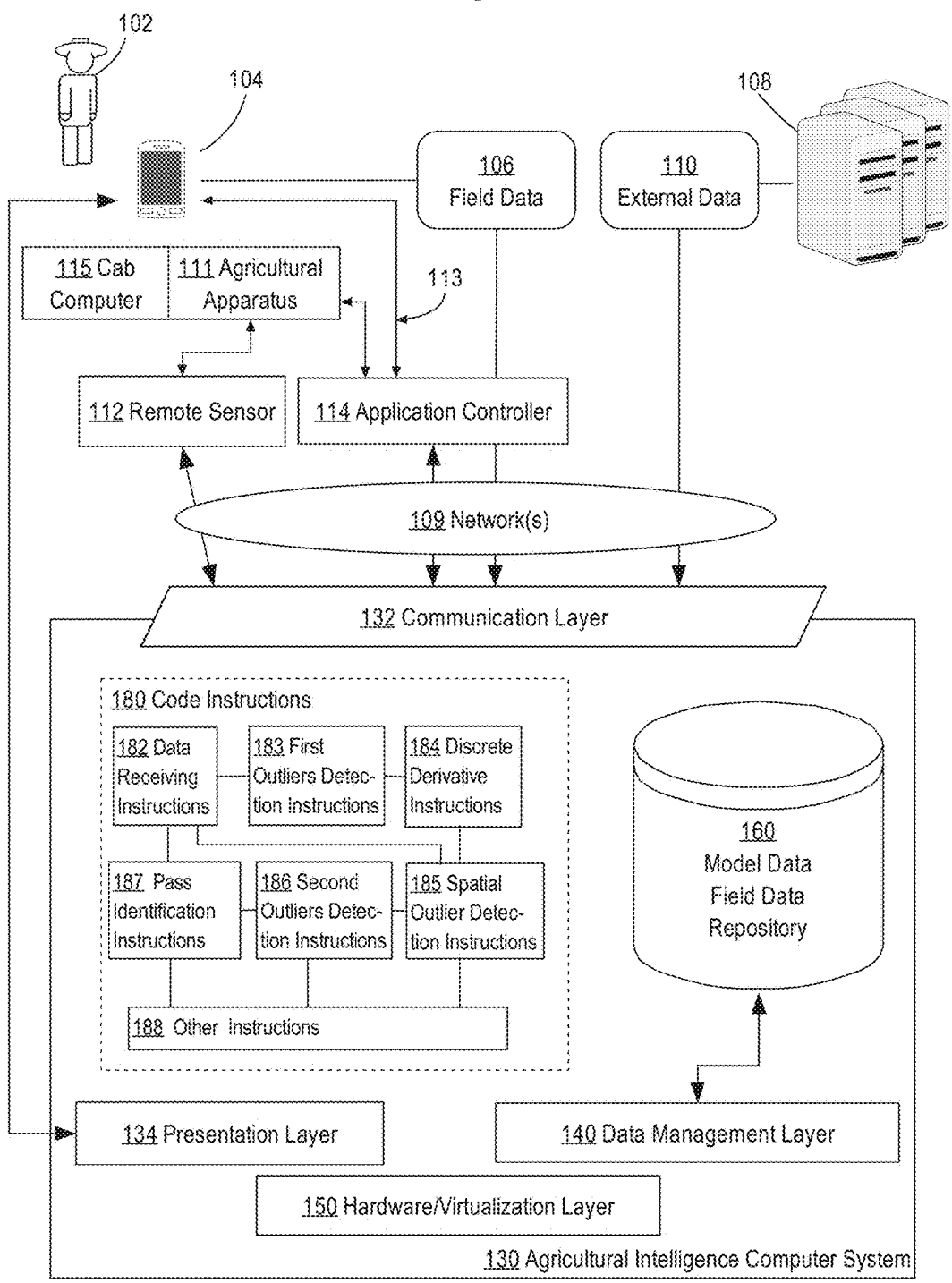
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. CONTAMINATED RAW YIELD DATA
   3.1 TYPES OF DATA CONTAMINATION
      3.1.1 START PASS DELAY
      3.1.2 END PASS DELAY
      3.1.3 FLOW LAG
   3.2 INITIAL PREPROCESSING OF RAW YIELD MAPS
4. EXAMPLE OF AUTOMATED YIELD OUTLIER DETECTION PIPELINE
5. AUTOMATIC DETECTION OF CONTAMINATION IN YIELD MAPS
   5.1 DETECTING START PASS DELAY OUTLIERS
   5.2 DETECTING END PASS DELAY OUTLIERS
   5.3 DETECTING OTHER TYPES OF OUTLIERS
      5.3.1 LOCAL DIFFERENCE APPROACH
      5.3.2 SURFACE AREA APPROACH
      5.3.3 STATISTICAL SPATIAL OUTLIER DETECTION APPROACH
6. LIBRARY FOR AUTOMATIC DETECTION OF CONTAMINATED DATA
7. BENEFITS OF DECONTAMINATED YIELD MAPS

1. General Overview

In an embodiment, an approach for an automatic detection of outliers in yield data maps is presented. An outlier is a potentially incorrect, yield data observation in a yield map that lies outside of the range of other yield data observations in the map.

An approach for an automatic detection of outliers in yield data maps may be implemented as a computer-based library. The library may include a set of programmable function calls and instructions configured to automatically detect outliers in the yield maps. The implementation may provide a computer-based tool available to agricultural researchers and crop growers. The results generated by the approach presented herein may be used to help the growers to manage agricultural fields and determine seeding and planting schedules.

In an embodiment, an approach for an automatic filtering of outliers in yield data includes a two-stage outlier detection approach. In a first stage, potentially erroneous yield observations caused by mechanical and harvesting-related problems are identified and removed from the yield data. In a second stage, data mining approaches are employed to consider yield data observations within local neighborhoods of observations to determine additional outliers that can be removed from the yield data.

In an embodiment, a method for an automatic detection of outliers in yield data is performed in a data processing system that comprises one or more processors and one or more non-transitory data storage media coupled to the processors. The data processor system stores sequences of instructions which, when executed using the processors, cause receiving over a computer network electronic digital data comprising yield data and representing yields of crops that have been harvested from an agricultural field. The yield data may be provided as yield data maps. The yield data maps, also referred to as maps, may include yield observations collected for one year or multiple years. The observations may be organized by harvesting passes.

In the context of crop harvesting, a pass is a harvesting cycle during which crop is harvested by a combine harvester. The crop may be harvested using for example, a one-pass method, or a two-pass method. In a one-pass method, biomass is harvested and recovered simultaneously. In a two-pass method, harvesting and recovery of biomass material are performed in separate passes. Typically, each pass is identified by a pass identifier.

In an embodiment, a method comprises, using the instructions programmed in the computer system, to determine, in the yield data, one or more passes, each pass including a plurality of observations.

In an embodiment, a method for an automatic detection of outliers in yield data comprises determining, for each pass of the one or more passes, one or more discrete derivatives based on a plurality of observations included in a pass.

A discrete derivative computed from yield data observations is a rate of change defined over a discrete domain of the yield data observations. The rates converging to zero may indicate that the changes in the yield data observations are relatively small. However, the rates exceeding a certain threshold value may indicate that the changes in the yield data observations are relatively large. The yield data observations having relatively large rates might be outliers and perhaps were recorded in error.

One or more discrete derivatives computed based on a plurality of observations included in a pass may be used to determine whether any of the observations included in the pass are outliers. The discrete derivatives may be used to provide a measure of whether the harvested mass flow, recorded by the observations in the pass, has reached a steady state. If the harvested mass flow has reached a steady state of the flow, then the derivatives computed for those observations may converge to zero.

However, if the harvested mass flow, recorded in the corresponding observations, has not reached a steady state, then the derivatives computed for those observations may exceed a certain threshold value. This may indicate an unsteady state of the flow. The harvested mass flow may be in an unsteady state during for example, a start pass or an end pass. A start pass is a harvesting pass during which a grain transporter has not been completely filled in. An end pass is a harvesting pass during which a grain transporter has not been emptied. Some of the observations that belong to start passes and end passes may be outliers, and thus may be removed from the yield data.

In an embodiment, based on the one or more discrete derivatives, first outlier data that includes the outliers is generated, and the process of identifying outliers may be repeated for all other passes.

In an embodiment, first filtered data is generated by removing the first outlier data from the yield data. The first filtered data is a result of completing a first stage of the approach for an automatic detection of outliers in the yield data.

In an embodiment, an approach for an automatic detection of outliers in yield data maps includes a second stage. In a second stage, for each observation in the yield data, a plurality of nearest neighbor observations for an observation is determined. A plurality of nearest neighbor observations for an observation may be determined by applying a local difference approach to a plurality of yield data observations in the yield data.

For each observation, a plurality of absolute differences in yield values between the observation and each of the plurality of nearest neighbor observations is determined. This may be determined by superimposing the yield data onto a rectangular grid, computing a surface area based on the rectangular grid, and using the surface area to determine the absolute differences for the observations.

In an embodiment, based on a plurality of absolute differences computed for an observation, an outlier score for the observation is determined and compared with a certain threshold. If the outlier score for the observation exceeds the certain threshold, then the observation is included in second outlier data. The process of identifying observations for which outlier scores exceed the certain threshold may be repeated for all other observations in the yield data.

In an embodiment, second filtered data is generated by removing the second outlier data from the first filtered data. The second filtered data is a result of completing both a first stage and a second stage of the approach for an automatic detection of outliers in yield data maps.

In an embodiment, second filtered data is used to automatically control a computer control system in terms of one or more of seeding practices, irrigation, nitrogen application, and harvesting.

In an embodiment, using a presentation layer of a computer system, a graphical representation of the yields of crops harvested from an agricultural field using only the second filtered data is generated. The graphical representation may be also displayed on a computing device. The graphical representation or the second filtered data may also be stored in a storage device, a cloud storage system, a memory unit, or any other system configured to store data.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

In an embodiment, agricultural intelligence computer system 130 is programmed with or comprises code instructions 180. For example, code instructions 180 may include data receiving instructions 182 which are programmed for receiving, over network(s) 109, electronic digital data comprising yield data. Code instructions 180 may also include pass identification instructions 187 which are programmed for identifying passes in the yield data; first outliers detection instructions 183 which are programmed for detecting first outliers in the yield data; discrete derivative instructions 184 which are programmed for determining discrete derivatives for the yield data; spatial outlier detection instructions 185 which are programmed for detecting spatial outliers in the yield data; second outlier detection instructions 186 which are programmed for detecting second outliers in the yield data; and other detection instructions 188.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U.S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
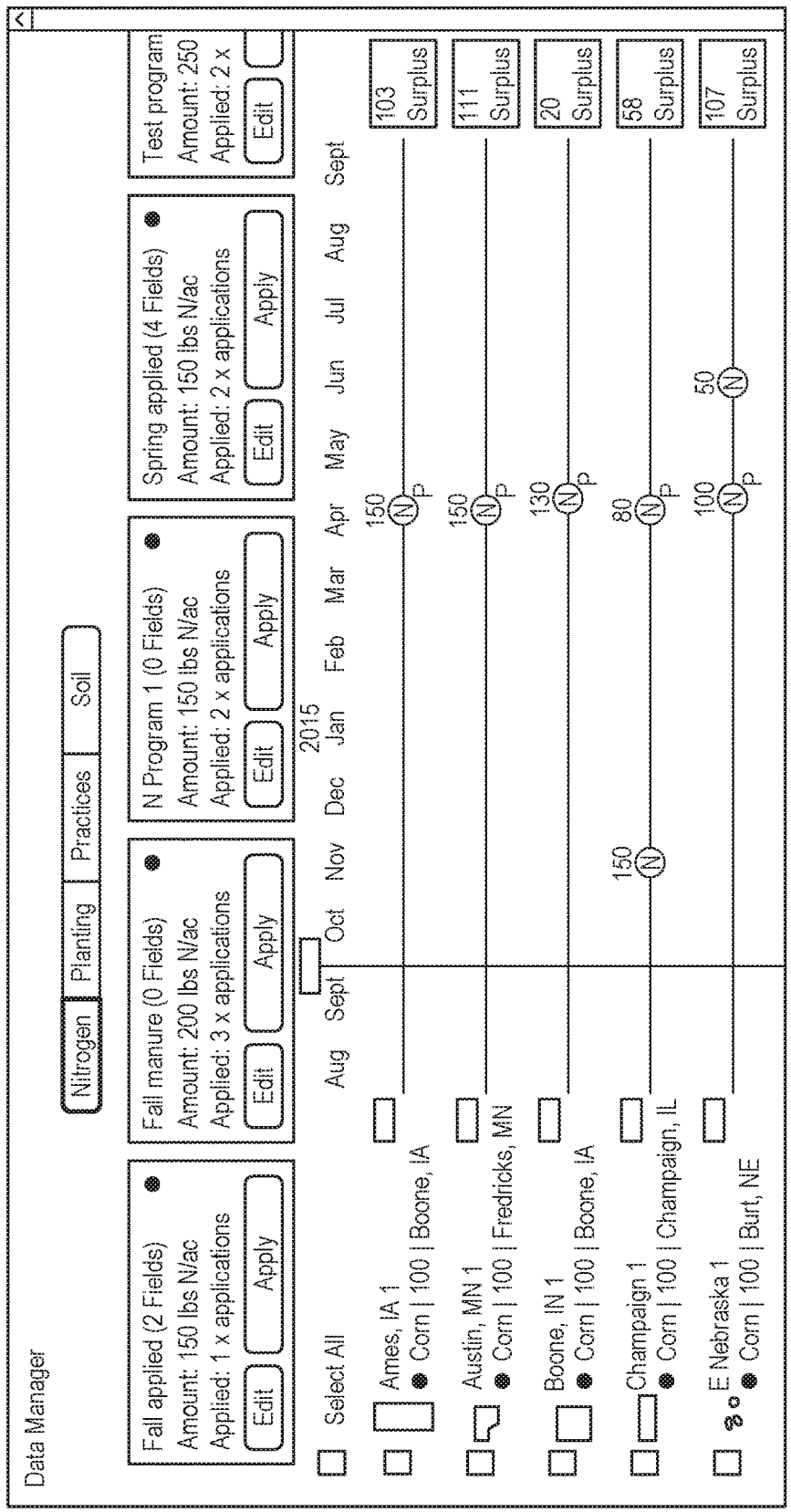
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Fall applied" program selected, which includes an application of 150 lbs. N/ac (pounds of nitrogen per acre) in early April. The data manager may provide an interface for editing a program. In an embodiment, when a particular program is edited, each field that has selected the particular program is edited. For example, in FIG. 5, if the "Fall applied" program is edited to reduce the application of nitrogen to 130 lbs. N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Fall applied" program is no longer being applied to the top field. While the nitrogen application in early April may remain, updates to the "Fall applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model data may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Figure 4:
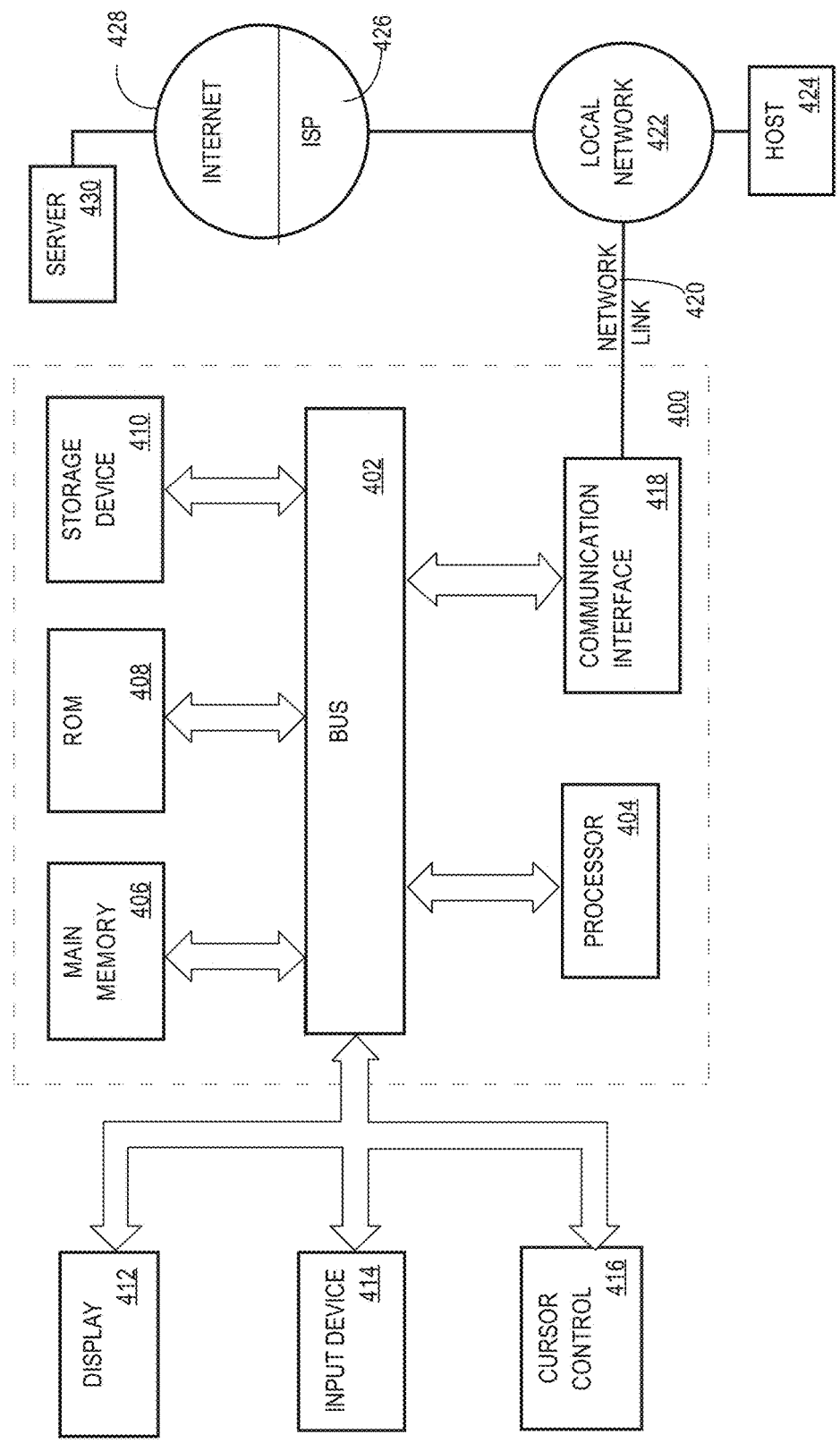
FIG. 4 is a block diagram that illustrates a computer system 400 upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), Wi-Fi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally and/or alternatively, a script may be sent directly to cab computer 115 from mobile computer application 200 and/or uploaded to one or more data servers and stored for further use. In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or Wi-Fi-based position or mapping apps that are programmed to determine location based upon nearby Wi-Fi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. No. 8,767,194 and U.S. Pat. No. 8,712,148 may be used, and the present disclosure assumes knowledge of those patent disclosures.

In another embodiment, sensors 112 and controllers 114 may comprise weather devices for monitoring weather conditions of fields. For example, the apparatus disclosed in International Pat. Application No. PCT/US2016/029609 may be used, and the present disclosure assumes knowledge of those patent disclosures.

2.4 Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truth data sources that compares predicted results with actual results on a field, such as a comparison of precipitation estimate with a rain gauge or sensor providing weather data at the same or nearby location or an estimate of nitrogen content with a soil sample measurement.

Figure 3:
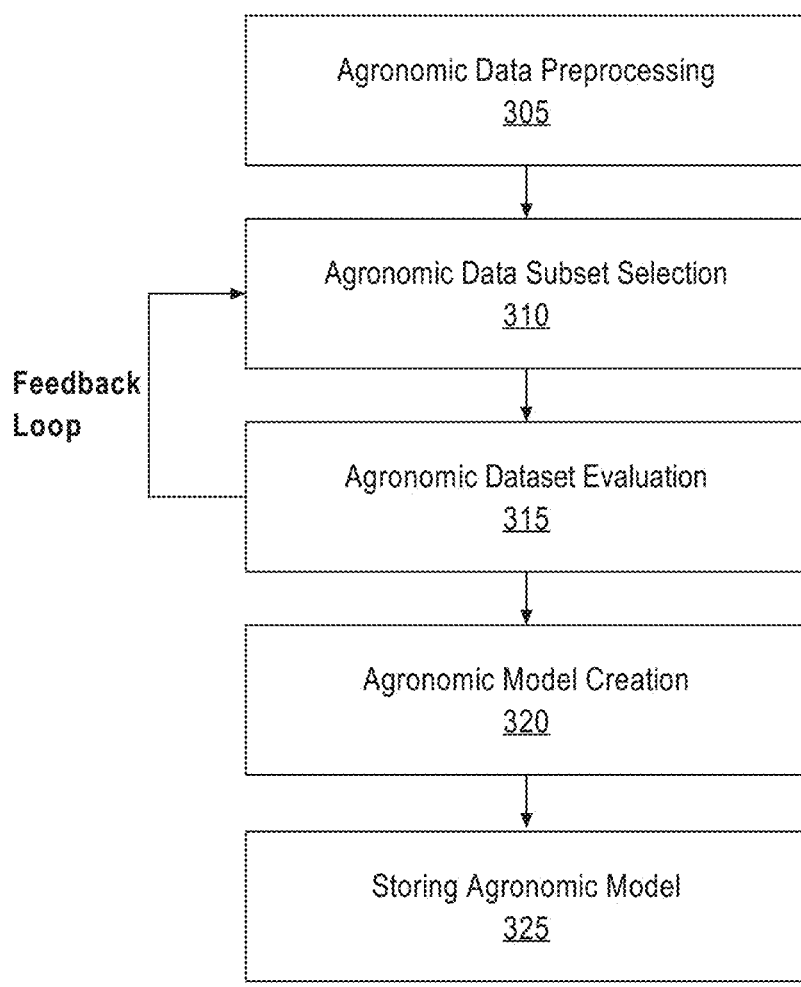
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Contaminated Raw Yield Data

Yield mapping is a process of gathering geo-referenced crop yield data that has been collected during harvest. The geo-referenced crop yield data is usually digitally stored in digital yield maps in unprocessed form, and thus often referred to as raw yield data. Raw yield data can be obtained automatically at harvest from specialized equipment installed on combines and other harvest apparatus.

Raw yield maps may include yield data that was collected within a certain time period, such as a year or several years. The maps may be provided for crops such as corn, soybeans, wheat, or others. The maps may be provided by crop growers, agricultural agencies, governmental agencies, and other providers. Since the maps are usually unprocessed, the maps often include incorrect data.

Even if yield maps are preliminarily preprocessed by the providers of the maps, the maps may still include errors. This is because some providers use manual and inaccurate methods for removing the errors from the maps. The incorrect data in yield maps is often referred to as contaminated data.

3.1 Types of Data Contamination

Contaminated data may include data that is considered to be incorrect or potentially incorrect. Such data may include for example, data that was captured by malfunctioning sensors of a combine harvester, or data that was incorrectly captured by a misaligned harvesting apparatus. For example, contaminated data may include data that has been incorrectly registered due to improperly calibrated sensors installed in combines. Contaminated data may also include errors introduced by an unresolved width of the harvester bar of the harvesting combine, a varying harvester speed with which the combine harvests the crops, narrow finishes of the harvesting passes, and turns and overlaps that the combine makes as it harvests the crops. The contaminated yield observations are referred to herein as outliers.

Outlier contamination in raw yield maps can be attributed to a number of irregularities occurring when the crop is harvested. Some of the irregularities include time delays caused by the harvesting dynamics as well as harvesting conditions.

Measurements of yields of crops may also be contaminated when sensors and measuring apparatus are incorrectly calibrated. The measurements may also be contaminated because of the delay between the moment when the crop is actually cut and the moment when the grain is actually measured by a sensor installed in a combine harvester. The delay may be measured as a flow lag, and may correspond to a time difference between the time when the crop is cut and the time when the grain reaches a mass flow sensor mounted on the top of the harvester. The error may result in shifting the measurements in such a way that the measurement indicates the location of the current grain mass flow that does not correspond to the actual location from which the grain flow was collected. For example, by the time the flow sensor detects the particular mass flow, a GPS location of the combine harvester may change and the delay measured often in seconds may not correspond to the GPS readings.

Data representing yields of crops may also be contaminated due to a delay introduced by a grain transporter of a combine harvester. This is often referred to as a harvester flow mode delay or a start pass delay. The start pass delay may be measured as a delay between a start of the pass indicated by a GPS sensor and the moment when a grain transporter fills at the start of a harvest pass. There also may be a harvester flow mode delay, also referred to as an end pass delay. The end pass delay may be measured as a delay between the moment when a GPS sensor indicated an end of the harvest pass and the moment when a grain transporter is emptied at the end of the harvest pass.

Measurements of yields of crops may also be contaminated by abrupt changes in the speed with which a combine harvester traverses a field. The abrupt changes in the speed may result in obtaining unrealistic yield measurements. Depending on how abrupt the changes in the speed are, the measurements may be either too high or too low.

Data representing yields of crops may also be contaminated when they are collected at the time when a combine harvester makes sharp turns. Also, the measurements may be contaminated at the time when a combine harvester changes a bar segment (swath) lengths, which may happen when the harvester makes sharp turns. The measurements may also be contaminated when accurate GPS information is not available or cannot be associated with the measurements. Lack of accurate GPS information can result in a yield map that is either shifted over the entire field, which is referred to as a systematic error, or is shifted to some incorrect location, which is referred to as a localized error. A systematic error may affect the entire dataset of measurement, and may be identified visually since the resulting yield map will not be aligned with the actual boundaries of the field. A localized error may affect a small number of measurements, such as the measurements identified as collected from the same location in the field.

Data contamination may also be caused by local circumstances surrounding the harvesting process. The circumstances may include dry, humid or dusty conditions present during the harvest that may unduly affect measurements of the grain moisture. Since the calculated yield depends on the grain moisture, erroneous moisture measurements may lead to erroneous yield measurements. For example, dry conditions may cause low grain moisture, and thus the measurements collected in the dry conditions may be lower than the actual yields of crop. On the other hand, humid conditions may cause high grain moisture, and thus the measurements collected in the humid conditions may be higher than the actual yields.

3.1.1 Start Pass Delay

A start pass delay, also referred to as a harvester fill mode delay, is a time delay during which a grain transporter fills at the start of a harvest pass. The start pass delay may be a few minutes long. A start pass delay starts when a pass starts and ends when a combine harvester reaches a steady state. In an embodiment, yield data measurements that were collected during a start pass delay of the harvester are automatically detected, and may be flagged as contaminated and then removed from yield data as contaminated.

3.1.2 End Pass Delay

An end pass delay, also referred to as a harvester finish mode delay, is a time delay during which a grain transporter is being emptied at the end of a harvest pass. In an embodiment, measurements that were collected during an end pass delay are automatically detected and may be flagged as contaminated and then removed from yield data as contaminated.

3.1.3 Flow Lag

A flow lag corresponds to the time from the moment when the crop is cut by a combine harvester to the moment when the crop grain reaches the mass flow sensor mounted on the top of the harvester. The flow lag is an error and results in shifting the crop measurements in such a way that the current grain mass flow measurement does not correspond to the GPS location recorded by the sensor for the current grain measurement. In an embodiment, measurements collected during a flow lag are automatically detected and may be flagged as contaminated and then removed from yield data as contaminated.

3.2 Initial Preprocessing of Raw Yield Maps

Raw yield maps usually contain a vast amount of data. The maps may be especially large when yield data measurements provided in the maps are recorded in short time intervals, such as 0.2 second long intervals. The typical maps may also contain a large number of contaminated data.

Yield maps provided by certain data sources may be initially preprocessed to remove at least some contaminated data. The preprocessing may be, however, rough or inaccurate. Therefore, the initially preprocessed yield maps usually require additional processing to remove the contaminations.

4. Example of Automated Yield Outlier Detection Pipeline

In an embodiment, an automatic detection of outliers in yield data is carried out using a series of computer-implemented data processing steps informally termed a pipeline. The pipeline may be configured to access various data sources that store yield data maps, and to access various programmable libraries that store code instructions for implementing the approach. The code instructions 180 may be programmed to perform data filtering, mechanical error detection, statistical outlier detection, data spatial analysis, and other automatic approaches for outlier detection to implement the pipeline.

Figure 7:
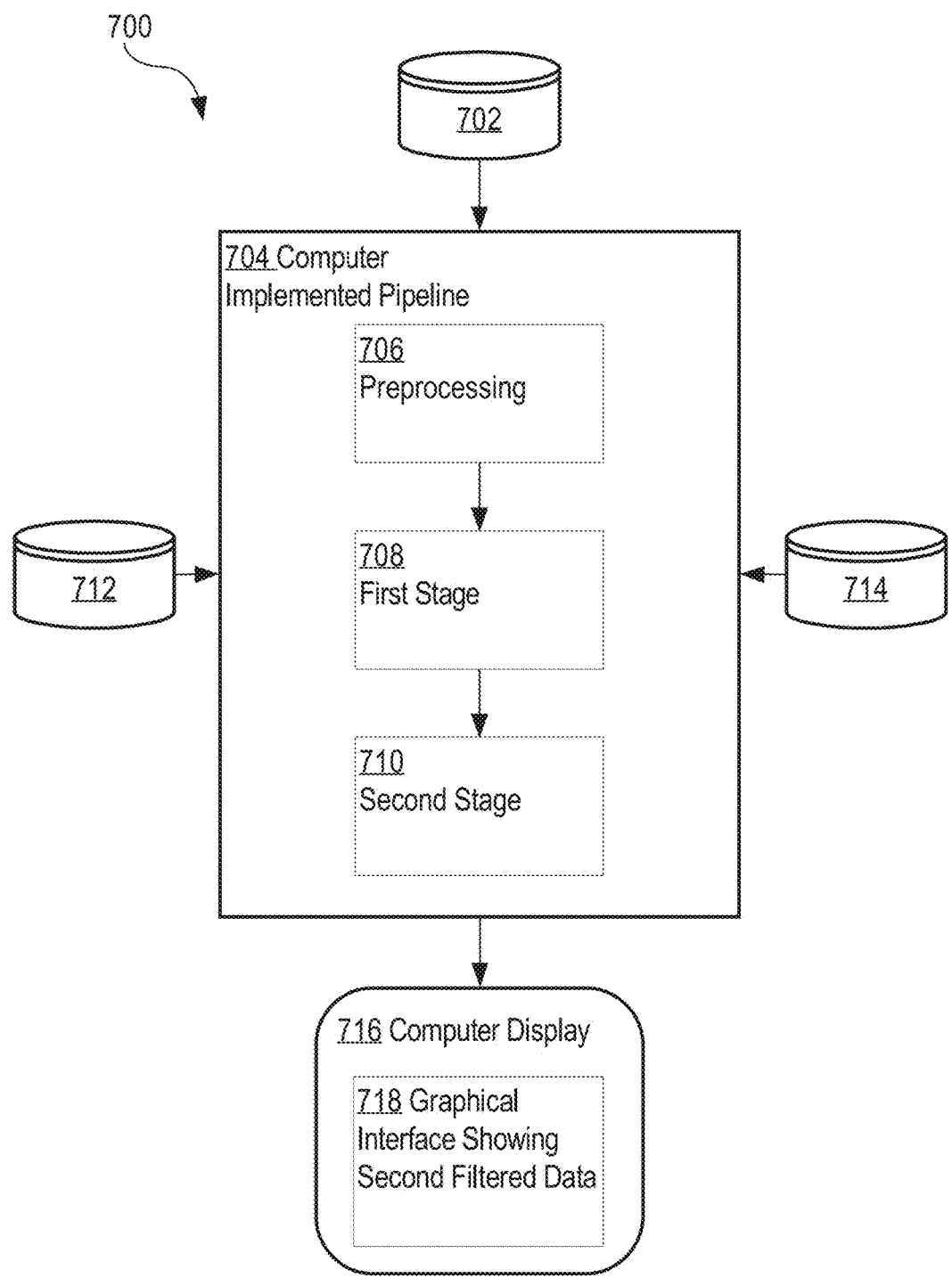
FIG. 7 depicts an example of automated, computer-implemented, yield outlier detection pipeline.

FIG. 7 depicts an example of automated, computer-implemented, yield outlier detection pipeline. FIG. 7 represents programmed processing steps and may represent an algorithm for use in programming the code instructions 180 and other instructions previously discussed for FIG. 1. In an embodiment, pipeline environment 700 comprises a pipeline 704 which is configured to implement an end-to-end process of detecting, flagging and/or removing contaminated yield data from yield maps.

Removal of contaminated data may include removing observations that include errors caused by a flow lag, an end pass delay, a variable speed with which crops are harvested, a too slow/fast speed with which crops are harvested, or a short swath/overlap. For example, the outliers caused by a flow lag may identified by setting a constant lag length and discarding those observations that were harvested in time periods smaller than the constant lag length. The outliers caused by an end pass delay may be detected as harvested in headlands, and may be distributed to preceding observations. The outliers caused by a harvester driving too slow, too fast, or changing a speed too frequently, may be identified based on the speed information provided for the respective observations. The observations recorded during short swaths or overlaps may be recorded as already-harvested, and excluded from the measurements for the particular area. An automatic approach for detecting the contaminated data is described below.

Raw yield data may be provided to pipeline 704 by programming system 130 (FIG. 1) to receive yield data as part of the field data 106. Or, pipeline 704 may query one or more databases 702 that store yield data maps for various fields, various time periods, and so forth. Pipeline 704 may also query other storage devices and systems, such as a cloud storage system, a data server, and the like.

Upon receiving yield data, pipeline 704 may determine whether to preprocess the yield data. If the yield data is to be preprocessed, then program instructions in block 706 are executed to preprocess the yield data.

Block 706 represents program instructions for preprocessing of yield data. The yield data preprocessing may include yield data checking and verifications. Examples of various preprocessing tasks are provided in FIG. 8.

FIG. 8 depicts an example computer-automated preprocessing of yield data. In an embodiment, preprocessing 800 includes identifying one or more outliers caused by for example, mechanical errors 802, and either flagging the outliers in the yield data, or removing the outliers from the yield data.

Block 804 represents program instructions for checking pass numbers. In block 804, yield data is preprocessed to determine whether pass numbers included in the yield data are correct. Examples of various tasks performed in this step are described in block 806. The tasks may include checking whether pass numbers are recorded correctly, checking whether each pass has only one associated number, checking whether each pass number is associated with only one pass, checking whether any pass is missing, and so forth.

Block 808 represents program instructions for identifying short passes. In block 808, yield data is preprocessed to determine whether any of the passes in yield data are short passes. Examples of various tasks performed in this step are described in block 810. The tasks may include identifying short passes using the following approach: a pass may be identified as a short pass if it has a minimum count of observations of 30 when its data logging interval is 1, or if it has a minimum count of observations of 15 when its data logging interval is 2. Thus, identifying short passes may include identifying those passes that have the minimum count of observations of 30 if their data logging interval is 1, or that have the minimum count of observations of 15 if their data logging interval is 2.

Block 812 represents program instructions for identifying flow lag delay. In block 812, yield data is preprocessed to determine whether the yield data includes any flow lag delays. Examples of various tasks performed in this step are described in block 814. The tasks may include determining whether a lag between two observations satisfies the following formula: lags=ceiling (1/(time interval))*2. Other formulas for determining a lag between observations may also be used.

Block 816 represents program instructions for identifying abrupt speed changes. In block 816, yield data is preprocessed to determine whether the yield data includes any observations with an abrupt speed change, a too-slow speed, or a too-fast speed. Examples of various tasks performed in this step are described in block 818. The tasks may include determining whether a speed change between two consecutive points is greater than 20%. The tasks may also include determining whether a recorded speed is less than 2 mph, or whether a recorded speed is greater than 7 mph.

Block 820 represents program instructions for identifying short swaths. In block 820, yield data is preprocessed to determine whether the yield data includes any observations indicating a short swath or overlap. Examples of various tasks performed in this step are described in block 822. The tasks may include determining identifying any observations corresponding to less than 80% of full recorded harvester bar width.

Preprocessing of yield data maps may include additional types of preprocessing not described in FIG. 8. The additional preprocessing may include a preprocessing of the yield data to remove outliers caused by errors other than mechanical errors.

Outliers identified by preprocessing a yield data map may be either flagged as potential outliers, or removed from the yield data map.

Referring again to FIG. 7, in an embodiment, computer-implemented pipeline 704 performs a first stage processing 708 of yield data.

Block 708 represents program instructions for performing a first stage processing of yield data. In first stage 708, pipeline 704 applies computer-implemented filters to the yield data to for example, identify, flag, and/or remove observations caused by start pass delays, end pass delays, flow lags, and the like.

In first stage 708, computer implemented pipeline 704 may refer to one or more computer-implemented libraries 712, 714. Libraries 712, 714 may be configured to store various computer programs and code that implement first stage processing 708. Pipeline 704 may, for example, query libraries 712, 714 to request the programmable instructions for implementing first stage processing 708. Details of the first stage processing are described in FIG. 9 (steps 902-912).

Block 710 represents program instructions for performing a second stage processing of yield data. In second stage 710, pipeline 704 applies one or more computer-implemented filters to the yield data to identify, flag, and/or remove outliers using for example, a nearest neighbors approach, a surface area approach, and/or a statistical spatial outlier detection approach.

In second stage 710, computer implemented pipeline 704 may refer to libraries 712, 714 mentioned above. Libraries 712, 714 may be configured to store various computer programs and code implementing for example, a nearest neighbors approach, a surface area approach, and/or a statistical spatial outlier detection approach. Pipeline 704 may for example, query libraries 712, 714 to request the programmable instructions for implementing a surface area approach for determining outliers caused by a flow lag. Details of the first stage processing are described in FIG. 9 (steps 914-920).

In an embodiment, upon completing second stage 710 processing of a yield data map, pipeline 704 generates second filtered data. Second filtered data may be generated by removing from the yield map that yield data observations that have been flagged as outliers in steps 706, 708, and/or 710.

In an embodiment, second filtered data is represented in a graphical form and transmitted to any type of computer display configured to display digital data. For example, pipeline 704 may transmit the second filtered data to a computer display 716, and display the second filtered data in a graphical user interface 718. Graphical user interface 718 may be programmed with widgets or controls to allow the grower to visualize the data.

Second filtered data may also be provided to a user as a PDF document, a Word document, a set of images, and the like. Second filtered data may be provided to a user using various data delivery media. For example, it may be stored in a cloud storage system, a database server, and others.

5. Automatic Detection of Contamination in Yield Maps

Automatic detection of contamination in raw yield maps is a process in which yield maps are analyzed and contaminated yield observations are identified or flagged, and then potentially removed from the maps. In an embodiment, an automatic detection of contaminated yield observations in raw yield maps provided for an agricultural field includes a two-stage outlier detection process. In a first stage, the raw yield maps are analyzed to target potential harvesting dynamics that may be responsible for erroneous yield observations. In a second stage, data mining libraries and approaches are employed to determine local neighborhoods within the agricultural field and use their local structure to identify and flag potential outliers. Both stages are directed to detecting outliers caused by start pass delays, end pass delays, flow lags, and the like.

Figure 9:
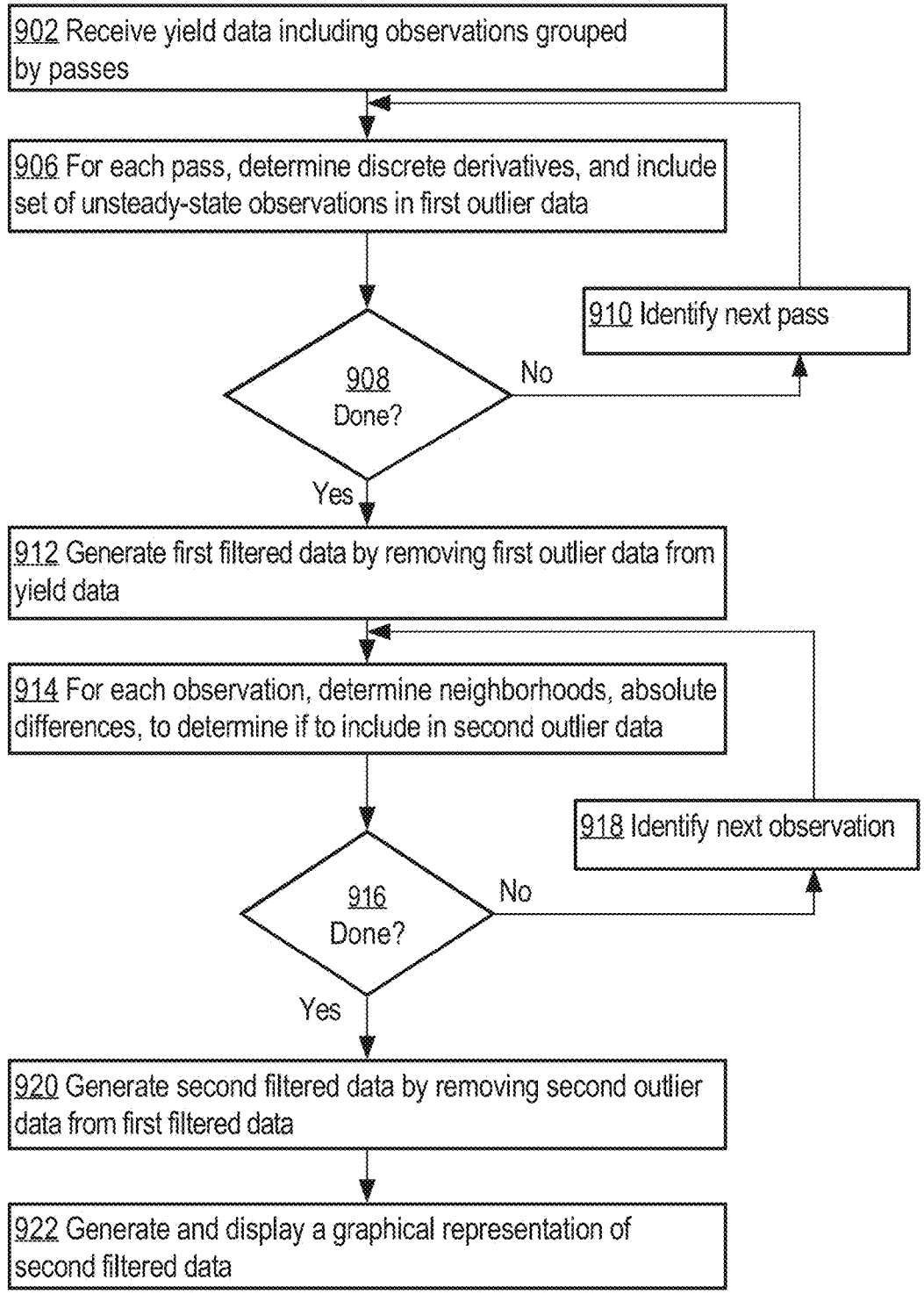
FIG. 9 depicts an example method for automatically detecting outliers in yield data.

FIG. 9 depicts an example method for automatically detecting outliers in yield data maps. In step 902, raw yield data is received. The raw yield data may be provided in form of a yield map. A map may include yield data observations collected during harvest of crops from an agricultural field. In an embodiment, yield data may include observations that are grouped by passes. For example, if a yield map includes two passes of data, then the map includes a first set of observations that belong to the first pass, and includes a second set of observations that belong to the second pass.

Also in step 902, yield data is analyzed to identify one or more passes for which observations are provided, and to identify a set of observations for each of the passes.

In step 906, for each pass, of the one or more passes, one or more discrete derivatives are determined based on a plurality of observations included in a pass.

One of the objectives for determining discrete derivatives based on observations included in a pass is to determine whether the observations in the pass indicate a steady state of the harvested mass flow. The harvested mass flow, recorded in the corresponding observations, has reached a steady state of the flow if the derivatives computed for the observations converge to zero. However, if the derivatives computed for the observations not only fail to converge to zero, but they exceed a certain threshold value, then the derivatives indicate that the harvested mass flow has not reached a steady state. This state may be referred to as an unsteady state. A harvested mass flow may be in an unsteady state during for example, a start pass during which a grain transporter has not been completely filled in.

5.1 Detecting Start Pass Delay Outliers

In an embodiment, a differentiation process for a start pass starts with computing discrete derivatives based on observations included in a pass. The derivatives may be computed using for example, the following equation:

$$\lim_{\Delta t \to 0} \frac{f(x + \Delta t) - f(x)}{\Delta t} = \frac{y_n - y_{n-1}}{\Delta t} \quad (1)$$

where y is a mass flow measured as a product of a count of bushels harvested per second and a time function in a time domain, where $\Delta t$ is a logging interval in a time domain, and where n is an index of the observation.

Typically, derivatives are calculated using a continuous function defined over a continuous domain. However, yield maps provide discrete, not continuous, observations. Therefore, in case of the observations provided in the yield maps, the logging interval $\Delta t$ may not converge to zero, and neither may the $\Delta$.

In an embodiment, a discrete derivative computed from discrete observations is obtained using an approximation. The approximation is used to determine whether the mass flow has reached a steady state.

In an embodiment, one or more absolute values of discrete derivatives for discrete observations are computed. Furthermore, a certain threshold value is set to for example, 0.1. The certain threshold indicates the beginning of a steady state.

Moreover, a certain observation may be set as a start of a steady state in the mass flow. For the observations subsequent to the certain observation, the absolute values of derivatives computed for those observations are less than 0.1.

Selection of a certain threshold has many implications. If the threshold is too small, and thus too rigid, then it is very likely that no steady state may be detected. Setting the value of 0.1 to the certain threshold appears to be slightly conservative and may cause identifying too many outliers. On the other hand, setting the threshold to a value larger than 0.1 may result in not detecting a significant count of the outliers.

In an embodiment, a differentiation process for a start pass delay starts with a curve fitting to the observations included in a pass. The curve fitting may also include computing continuous derivatives for the fitted curve. Based on the continuous derivatives, one or more turning points for the curve at which corresponding derivatives are close to 0.0 are determined.

Using a curve fitting approach has, however, some drawbacks. For example, there might a large variation in the observations, and thus fitting a curve to the observations may be difficult. Therefore the approach based on computing discrete derivatives and calculating absolute values of the discrete derivatives may be more accurate than a cure fitting approach.

5.2 Detecting End Pass Delay Outliers

In an embodiment, a differentiation process for an end pass delay starts with computing discrete derivatives based on observations included in the end pass. The process of computing the discrete derivatives for the end pass is essentially a backwards implementation of the process for computing the discrete derivatives for a start pass delay. The discrete derivatives are computed for the end pass to observe when a mass flow leaves the steady state, and thus harvesting of the crops is being diminished.

Discrete derivatives for detecting end pass delay outliers may be computed using for example, the following equation:

$$\lim_{\Delta t \to 0} \frac{f(x - \Delta t) - f(x)}{\Delta t} \quad (2)$$

which is computed by subtracting $y_n$ from $y_{n-1}$ and dividing the result by $\Delta t$; where y is a mass flow measured as a product of a count of bushels harvested per second and a time function in a time domain, where $\Delta t$ is a logging interval in a time domain, and where n is an index of the observation.

In an embodiment, one or more absolute values of discrete derivatives for discrete observations are computed. Furthermore a certain threshold may be set. The threshold may be set and adjusted according to characteristics of the source that provided the data. For example, if the data is received from a first source, then the threshold may be set to for example, 0.1. If the data is received from a second source, then the threshold may be set to for example, 2.0. The certain threshold indicates the end of a steady state. Moreover, a certain observation is set as an end of a steady state in the mass flow. For the observations subsequent to the certain observation, their absolute values of derivatives are usually greater than 0.1.

Selection of a certain threshold value for an end pass delay has similar implications as for a start pass delay. If the threshold is too small, and thus too rigid, then it is very likely that an end of the steady state is not detected. Setting the value of 0.1 to the certain threshold appears to be slightly conservative and may cause identifying too many outliers. On the other hand, the implications of setting values larger than 0.1 may lead to not detecting a significant amount of the outliers.

Referring again to FIG. 9, also in step 906, based on the one or more discrete derivatives, a set of unsteady-state observations is determined. As described above, if absolute values of discrete derivatives exceed a certain threshold for a particular observation, then the observation may correspond to a mass flow being in an unsteady state.

A set of unsteady-state observations for a pass may include no observations. This may occur when the pass is neither a start pass nor an end pass. This may also occur when even if the pass is either a start pass or an end pass. This may also occur when either the certain threshold value was set too high, or the observations did not actually include any outliers.

A set of unsteady-state observations for a pass may include one or more observations. This may occur when the pass is either a start pass or an end pass, and the observations collected for the pass indeed included outliers.

Also in step 906, a set of unsteady-state observations is included in first outlier data. First outlier data is the data that has been detected as potentially including outliers caused by start pass delays and/or end pass delays. The first outlier data may be modified later by adding additional outliers identified using the approaches described below.

In step 908, a test is performed to determine whether all passes in yield data have been already analyzed for the purpose of identifying outliers caused by start pass delays and/or end pass delays. If not all passes have been already analyzed, then in step 910, a next pass is identified, and the step 906 is repeated for the observations from the next pass. However, if all passes have been already analyzed, then step 912 is performed.

In step 912, the first outlier data is removed from the yield data. The removal of the first outlier data from the yield data causes removing the outliers identified by processing start pass delays and/or end pass delays from the yield data. This steps ends a first stage of a process of the automatic detection of contamination in raw yield data.

In step 914, a second stage of a process of the automatic detection of contamination in raw yield data starts. In this step, one or more automated approaches for detecting outliers are implemented. The automated approaches may include the approaches for detecting outliers caused by flow lags.

5.3 Detecting Other Types of Outliers

In an embodiment, an automated process for detecting outliers is implemented using any of the following approaches: a local difference approach, a surface area approach, or a statistical spatial outlier detection approach. The approaches may be used to detect outliers caused by for example, flow lags. Each of the approaches is described below.

5.3.1 Local Difference Approach

In an embodiment, an automated process for detecting outliers is implemented by modifying a local difference approach by providing a solution for removing statistical outliers. In step 914, for each observation in a yield data map, a set of nearest neighboring observations are determined. A set generated for a particular yield data observation may include for example, eight near neighboring observations. The neighborhood property may be determined based on longitude and latitude parameters associated with an observation.

Also in step 914, for each observation, a set of absolute differences is determined. An absolute difference for an observation and its neighbor may be computed by for example, computing an absolute value a distance between the observation and the neighbor.

In an embodiment, a distance between an observation and a nearest neighbor has an assigned weight. A weight may be assigned according to the distance. For example, the smaller the distance between an observation and its neighbor, the larger the weight.

Let assume that an observation is denoted by x, and eight nearest neighbors of x are denoted by $(x_1, x_2, x_3, x_4, x_5, x_6, x_7, x_8)$. A vector of absolute differences may be denoted as $a=(d_1, d_2, d_3, d_4, d_5, d_6, d_7, d_8)=(|x-x_1|, |x-x_2|, |x-x_3|, |x-x_4|, |x-x_5|, |x-x_6|, |x-x_7|, |x-x_8|)$. A vector of inverse-distances may be denoted as:

$$\left(\frac{1}{d_1}, \frac{1}{d_2}, \dots, \frac{1}{d_8}\right) \quad (3)$$

In an embodiment, the inverse-distances may be normalized using their sum. This may be denoted using the following expression:

$$\zeta = \sum_{i=1}^{8} \frac{1}{d_i} \quad (4)$$

The sum from expression (5) may be used to determine a vector weights. A vector of weights may be determined using the following expression:

$$w = \left(\frac{\frac{1}{d_1}}{\zeta}, \frac{\frac{1}{d_2}}{\zeta}, \dots, \frac{\frac{1}{d_8}}{\zeta}\right) \quad (5)$$

In an embodiment, for each observation, the distances between the observation and its respective nearest neighbors are multiplied by the respective weights.

In an embodiment, distances computed as either weighted or not, are summed up across all observations. Then, for each observation, its respective sum of distances is compared with the sum derived across all observations. The comparison may be used to determine those observations that may be flagged as outliers in step 914.

In step 914, observations flagged so far are included in second outlier data. Second outlier data includes the data that has been detected as potentially including outliers caused by flow lags. The second outlier data may be modified later by adding additional outliers identified using the approaches described below.

In step 916, a test is performed to determine whether the local difference approach has been already performed on all observations in a yield data map. If not all observations have been analyzed, then in step 918, a next observation is identified and the step 914 is repeated for the observation. However, if all observations have been already analyzed, then step 920 is performed.

In step 920, second outlier data is removed from first filtered data. The removal of the second outlier data from the first filtered data causes removing the outliers identified by performing a local difference approach. This steps ends a second stage of a process of the automatic detection of contamination in raw yield data.

In an embodiment, step 922 is performed. In step 922, a graphical representation of second filtered data is generated. The graphical representation of the second filtered data may be then displayed on a graphical user interface on a computer workstation, a laptop, a smartphone, a computer server, or any of the device equipped with a computer generated display.

Second filtered data may also be stored in a cloud storage device, a database server or any other device configured to store data. Second filtered data may be saved before storing in any data format designed for representing electronic data.

One of the benefits of the local difference approach is that the approach takes into consideration geospatial location and correlation between the observations. Furthermore, the approach takes into consideration the closeness in terms of a geographical distance between the observations.

5.3.2 Surface Area Approach

In an embodiment, an automated process for detecting outliers is implemented using a surface area approach. Referring to FIG. 9, this approach may be executed in step 914, in which instead of executing a local difference approach, the surface area approach is executed.

In an embodiment, a surface area approach includes determining a rectangular grid for the yield data, and superimposing the yield data onto the rectangular grid. For example, a particular yield data observation, from the yield data, may be associated with a particular point on the rectangular grid.

From the yield data observations superimposed on a rectangular grid, a three-dimensional surface for the whole yield data set may be generated. A three-dimensional surface may be generated by for example, treating the yield data observations as control points and defining any type of spline surface over the control points.

In an embodiment, a surface area is calculated for the three-dimensional surface generated from yield data points. A surface area may be calculated using various approaches. According to one approach, a three-dimensional surface generated from yield data points superimposed on grid cells, each cell having a square shape.

Let $x_s$ denotes a difference between the maximum longitude value and the minimum longitude value, and $y_s$ denotes a difference between the maximum latitude value and the minimum latitude value of the observations included in the s grid cell. A lateral size of the unit cell may be denoted using the following expression:

$$L = \sqrt{\frac{x_s \times y_s}{N}} \quad (6)$$

In an embodiment, the process is repeated for all cells along the horizontal direction of the grid and for all cells along the vertical direction of the grid.

In an embodiment, each grid cell is assigned a mean value of yield data points whose geospatial location will fall within the cell coordinates. A cell with no data points is assigned the overall mean yield value.

A surface area may be calculated by triangulating the grid and using the assigned yield value of each grid point as its height. Based on, at least in part, on the surface area information and the grid information, one or more outliers may be identified.

5.3.3 Statistical Spatial Outlier Detection Approach

In an embodiment, an automated process for detecting outliers is implemented using a statistical spatial outlier detection approach. Referring to FIG. 9, this approach may be executed in step 914, in which instead of executing a local difference approach, the statistical outlier detection approach is executed.

In an embodiment, a spatial outlier detection include applying one or more spatial outlier detectors to first filtered data or to any type of yield data. The detectors may compute scores for the first filtered data items, and the data items with extreme scores are flagged as outliers. The data items with extreme scores may be referred to as second filtered data items or S-outliers.

In an embodiment, an approach based on a spatial outlier detector is modified by providing a solution for determining a number of neighbors used for outlier detection. A spatial outlier detector usually computes an aggregate function for each measurement by computing the aggregate function of the k nearest neighbors of the measurement. The aggregate function may be computed as a mean value of the k nearest neighbors or a weighted mean value of the k nearest neighbors. The aggregate function may also be computed as a median value, or any other method that allows capturing spatial auto-correlation between the measurements within the neighborhood. The spatial auto-correlation between the measurements within the neighborhood may be determined in a time-space, in a location-space, and based on any type of characteristics of the measurements.

A spatial outlier detector may also compute a weighted aggregate function for each measurement by determining respective weigh values and computing the weighted aggregate function of the k nearest neighbors of the measurement. A weighted aggregate function may be computed as a weighted mean value of the k nearest neighbors, and may be used to determine second outlier data.

Second outlier data may be determined based on weighted spatial characteristics. This approach may include computing a weighted mean value. In this approach, a set of neighboring first filtered data may be determined for a particular first filtered data item in the first filtered data. Then, a respective weight value may be determined for each item in the first filtered data. A weight value determined for a data item may be reversely proportional to the distance between the data item and the particular first filtered data item. The data item values and the respective weights are used to compute a weighted aggregated mean value, and the weighted aggregated mean value is used to determine whether the particular first filtered data item is to be excluded from the first filtered data.

The weights may represent different characteristics and criteria. For example, the data items in a group of items that were collected within the same time interval as a particular data item may have higher weight values than the data items in the group that were collected in other time intervals. Since the data items that were collected in the same time interval as the particular data will have associated higher weight values than the weights of other data items within the group, the weighted aggregate mean value will be influenced primarily by the data items that were collected in the same time interval as the particular data, not by the other data items. Therefore, this approach gives a preferential treatment to the clusters of data items collected approximately within the same time interval, and lesser treatment to the other data items within the group of data items.

Other weights may represent a distance-based proximity between data items within a group of data items. For example, the data items in a group of items that were collected from field locations similar to a particular field location from which a particular data item was located may have higher weight values than the data items in the group that were collected from other field locations. Since the data items that were collected from the field locations similar to the particular field location, the weighted aggregate mean value will be influenced primarily by the items that were collected from the field locations similar to the particular field location, and less by the other data values in the group. Therefore, this approach gives a preferential treatment to the clusters of data items collected from the closely neighboring fields, and lesser treatment to the other items within the group of data items.

In an embodiment, yield data is cleaned by removing from the yield data the outliers detected using the approaches described above. The cleaned yield data may be used to automatically control a computer control system of one or more of seeding, irrigation, nitrogen application, and harvesting apparatuses.

6. Library for Automatic Detection of Contaminated Data

In an embodiment, an approach for an automatic detection of contaminated data in yield data is encoded in program code, and the program code stored in a computer-based library. The program code may include code instructions, program calls and routines that can be executed by a computer. The program code may be invoked as individual calls, or may be implemented as a tool executed on computer systems.

The library may also provide instructions for generating and displaying a graphical user interface programmed to provide ways for selecting various options and for performing an automatic detection of contaminated data in yield maps. The graphical user interface may also be programmed to provide tools for displaying the results of each of the approaches, and to allow a user to set parameters for executing the detector of contaminated data, and to set parameters for displaying the results of the detector.

The graphical user interface may also be programmable to compare the results generated using different approaches for the automatic detection of the contaminated data, and to generate recommendations to crop growers and researchers about various aspects of enhancing the yields of crops.

7. Benefits of Decontaminated Yield Maps

Using the techniques described herein, computers can generate decontaminated yield maps based on digital data representing historical yields harvested from an agricultural field. In addition to enabling the computers to generate the decontaminated yield maps, the techniques herein can also enable the computers to make the decontaminated maps available to crop growers, and enable the computers to generate recommendations to help the growers to improve their agricultural practices.

The presented techniques can also enable the agricultural intelligence computing system to automatically decontaminate yield maps, and process the decontaminated yield maps to derive guidelines for crop growers with respect to seeding, irrigation, application of fertilizers such as nitrogen, and/or harvesting.

Moreover, the presented techniques can enable the agricultural intelligence computing system to save computational resources, such as data storage, computing power, and computer memory of the system, by implementing a programmable pipeline configured to automatically generate decontaminated data based on digital data. The programmable pipeline can automatically generate recommendations and alerts for farmers, insurance companies, and researchers, thereby allowing for a more effective agricultural management in the seeding schedules, operations of agricultural equipment, and application of chemicals to fields, protection of crops and other tangible steps in the management of agricultural field.

What is claimed is:

1. A method for providing an improvement in automating outlier detection in harvested data using agricultural applications, the method comprising:

using instructions programmed in a computer system, comprising one or more processors and computer memory, sending requests to one or more remote sensors installed on agricultural equipment to provide, over a computer network, electronic digital data comprising yield data and representing yields of crops that have been harvested from an agricultural field;

using the instructions programmed in the computer system, receiving from the one or more remote sensors installed on the agricultural equipment, in response to sending the request to the one or more remote sensors, the electronic digital data comprising the yield data;

using the instructions programmed in the computer system, determining, in the yield data, one or more passes, each pass including a plurality of observations;

for each pass of the one or more passes: determining one or more discrete derivatives based on a plurality of observations included in a pass; based on the one or more discrete derivatives determining a set of unsteady-state observations of the plurality of observations for which a crop mass flow is unsteady; including the set of unsteady-state observations in first outlier data; and repeating the step of determining the set of unsteady-state observations for all other passes;

generating first filtered data by removing the first outlier data from the yield data;

wherein the first outlier data includes data that was incorrectly captured by a misaligned harvesting apparatus; and wherein the first outlier data includes one or more of: a start pass delay outlier, an end pass delay outlier, a short pass outlier, a flow lag outlier, an outlier caused by an abrupt speed change, or an outlier caused by a short swath;

for each observation in the yield data, determining a plurality of nearest neighbor observations for an observation; determining a three-dimensional surface comprising a plurality of surface yield values computed based on the plurality of nearest neighbor observations determined for the observation; based on the plurality of surface yield values, determining an outlier height for the observation; including the observation in second outlier data if the outlier height for the observation exceeds a certain threshold; and repeating the step of determining the observations with outlier scores exceeding the certain threshold for all other observations;

generating second filtered data by removing the second outlier data from the first filtered data;

using a presentation layer of the computer system, generating and causing displaying on a computing device a graphical representation of the yields of crops harvested from the agricultural field using only the second filtered data.

2. The method of claim 1, wherein the one or more passes include at least one start pass or at least one end pass; wherein a start pass is a harvesting pass during which a grain transporter has not been completely filled in; wherein an end pass is a harvesting pass during which a grain transporter is being emptied.

3. The method of claim 1, further comprising determining the one or more discrete derivatives for the plurality of observations based on corresponding mass flow amounts determined for discrete time periods.

4. The method of claim 1, wherein the second filtered data is used to automatically control a computer control system of one or more of seeding, irrigation, nitrogen application, or harvesting practices.

5. The method of claim 1, further comprising determining the plurality of nearest neighbor observations for an observation by applying a local difference approach to a plurality of yield data observations in the yield data.

6. The method of claim 1, further comprising superimposing the yield data onto a rectangular grid, computing a surface area based on the rectangular grid, using the surface area to determine a set of observations within the rectangular grid that includes outliers, and including the set of observations in the second outlier data.

7. The method of claim 1, further comprising determining the second outlier data by: for each observation from the yield data, determining a set of neighboring yield data observations that were collected either shortly before or shortly after an observation was collected; computing an aggregate mean value from the set of neighboring yield data observations; and based on, at least in part, the aggregate mean value, determining whether to include the observation in the second outlier data.

8. The method of claim 1, further comprising determining the second outlier data by: for each observation from the yield data, determining a set of neighboring yield data observations that were collected either a first distance before or a second distance after an observation was collected; determining a set of weights for the set of neighboring yield data observations; computing a weighted aggregate mean value from the set of neighboring yield data observations and the set of weights; and based on, at least in part, the weighted aggregate mean value, determining whether to include the observation in the second outlier data;

wherein a particular weight value for a particular neighbor observation is inversely proportional to a distance value measured between a location at which the yield data observation was collected and a location at which the particular neighbor observation was collected.

9. The method of claim 1, further comprising generating one or more computer-implemented libraries comprising programmed instructions for detecting, in the yield data, observations contaminated due to errors occurring during a harvesting process.

10. A data processing system for providing an improvement in automating outlier detection in harvested data using agricultural applications, the data processing system comprising:

one or more processors;

one or more non-transitory data storage media coupled to the one or more processors and storing sequences of instructions which, when executed using the one or more processors, cause performing:

send requests to one or more remote sensors installed on agricultural equipment to provide, over a computer network, electronic digital data comprising yield data and representing yields of crops that have been harvested from an agricultural field;

receive from the one or more remote sensors installed on the agricultural equipment, in response to sending the request to the one or more remote sensors, the electronic digital data comprising the yield data;

determine, in the yield data, one or more passes, each pass including a plurality of observations;

for each pass of the one or more passes: determine one or more discrete derivatives based on a plurality of observations included in a pass; based on the one or more discrete derivatives determine a set of unsteady-state observations of the plurality of observations for which a crop mass flow is unsteady; include the set of unsteady-state observations in first outlier data; and repeat the step of determining the set of unsteady-state observations for all other passes;

generate first filtered data by removing the first outlier data from the yield data;

wherein the first outlier data includes data that was incorrectly captured by a misaligned harvesting apparatus; and wherein the first outlier data includes one or more of: a start pass delay outlier, an end pass delay outlier, a short pass outlier, a flow lag outlier, an outlier caused by an abrupt speed change, or an outlier caused by a short swath;

for each observation in the yield data: determine a plurality of nearest neighbor observations for an observation; determine a three-dimensional surface comprising a plurality of surface yield values computed based on the plurality of nearest neighbor observations determined for the observation; based on the plurality of surface yield values, determine an outlier height for the observation; include the observation in second outlier data if the outlier height for the observation exceeds a certain threshold; and repeat the step of determining the observations with outlier scores exceeding the certain threshold for all other observations;

generate second filtered data by removing the second outlier data from the first filtered data;

generate and cause displaying on a computing device a graphical representation of the yields of crops harvested from the agricultural field using only the second filtered data.

11. The data processing system of claim 10, wherein the one or more passes include at least one start pass or at least one end pass; wherein a start pass is a harvesting pass during which a grain transporter has not been completely filled in; wherein an end pass is a harvesting pass during which a grain transporter is being emptied.

12. The data processing system of claim 10, storing additional sequences of instructions which, when executed using the one or more processors, cause performing: determine the one or more discrete derivatives for the plurality of observations based on corresponding mass flow amounts determined for discrete time periods.

13. The data processing system of claim 10, wherein the second filtered data is used to automatically control a computer control system of one or more of seeding, irrigation, nitrogen application, or harvesting practices.

14. The data processing system of claim 10, storing additional sequences of instructions which, when executed using the one or more processors, cause performing: determine the plurality of nearest neighbor observations for an observation by applying a local difference approach to a plurality of yield data observations in the yield data.

15. The data processing system of claim 10, storing additional sequences of instructions which, when executed using the one or more processors, cause performing: superimpose the yield data onto a rectangular grid, compute a surface area based on the rectangular grid, use the surface area to determine a set of observations within the rectangular grid that includes outliers, and include the set of observations in the second outlier data.

16. The data processing system of claim 10, storing additional sequences of instructions which, when executed using the one or more processors, cause performing: determine the second outlier data by: for each observation from the yield data, determine a set of neighboring yield data observations that were collected either shortly before or shortly after an observation was collected; compute an aggregate mean value from the set of neighboring yield data observations; and based on, at least in part, the aggregate mean value, determine whether to include the observation in the second outlier data.

17. The data processing system of claim 10, storing additional sequences of instructions which, when executed using the one or more processors, cause performing: determine the second outlier data by: for each observation from the yield data, determine a set of neighboring yield data observations that were collected either a first distance before or a second distance after an observation was collected; determine a set of weights for the set of neighboring yield data observations; compute a weighted aggregate mean value from the set of neighboring yield data observations and the set of weights; and based on, at least in part, the weighted aggregate mean value, determine whether to include the observation in the second outlier data;

wherein a particular weight value for a particular neighbor observation is inversely proportional to a distance value measured between a location at which the yield data observation was collected and a location at which the particular neighbor observation was collected.

18. The data processing system of claim 10, storing additional sequences of instructions which, when executed using the one or more processors, cause performing: generate one or more computer-implemented libraries comprising programmed instructions for detecting, in the yield data, observations contaminated due to errors occurring during a harvesting process.

* * * * *